United States Patent [19]

Wagner

[11] 4,239,339
[45] Dec. 16, 1980

[54] VARIFOCAL OBJECTIVE FOR PHOTOGRAPHIC CAMERA

[75] Inventor: Werner Wagner, Odernheim, Fed. Rep. of Germany

[73] Assignees: Jos. Schneider GmbH & Co.; Optische Werke Kreuznach, both of Bad Kreuznach, Fed. Rep. of Germany

[21] Appl. No.: 55,532

[22] Filed: Jul. 9, 1979

[30] Foreign Application Priority Data

Jul. 10, 1978 [DE] Fed. Rep. of Germany ....... 2830202

[51] Int. Cl.³ .............................................. G02B 15/18
[52] U.S. Cl. .................................................. 350/184
[58] Field of Search ................ 350/184, 186, 176, 177

[56] References Cited

U.S. PATENT DOCUMENTS

| | | | |
|---|---|---|---|
| 3,891,304 | 6/1975 | Muszumanski et al. ............. | 350/184 |
| 4,087,160 | 5/1978 | Besenmalter et al. ............... | 350/184 |

*Primary Examiner*—Paul A. Sacher
*Attorney, Agent, or Firm*—Karl F. Ross

[57] ABSTRACT

The disclosed camera objective has a fixed rear lens group preceded by a four-component front group with negatively refracting second and third components which are axially shiftable between positively refracting first and fourth components to establish a minimum overall focal length $F_{min}$ and a maximum overall focal length $F_{max}$ with a ratio of about 1:2. The substantially stationary first component consists of a negative front lens (which may be limitedly shiftable for focusing purposes) followed by three positive lenses while the movable second component consists of two negative lenses followed by a positive lens; the movable third component and the fixed fourth component are constituted by a negative and a positive lens, respectively. The range of overall focal lengths, the image diagonal and the back-focal length of the objective as well as the individual focal lengths of the first and fourth components and of the rear lens group all lie between the absolute magnitudes of the individual focal lengths of the second and third components.

11 Claims, 4 Drawing Figures

VARIFOCAL OBJECTIVE FOR PHOTOGRAPHIC CAMERA

FIELD OF THE INVENTION

My present invention relates to an objective of the varifocal type for a photographic camera.

BACKGROUND OF THE INVENTION

Varifocal camera objectives of the type here envisaged are divided into a variable-focus front lens group and a fixed-focus rear lens group; the front group consists of four distinct components, namely a multilens first component of positive refractivity (considered stationary even though one or more of its lenses may be limitedly shiftable for focusing purposes), axially shiftable second and third components of negative refractivity, and a stationary positively refracting fourth component.

For certain cameras, such as those producing middle-sized still photographs of 60×60 mm or 45×60 mm, such objectives have hitherto been difficult to design in view of dimensional considerations imposing limitations upon total axial length and maximum lens diameter.

OBJECTS OF THE INVENTION

The general object of my present invention is to provide a varifocal objective of the type referred to which, with due regard to these dimensional restrictions, satisfies the requirements for good optical performance, simple construction and large relative aperture (preferably 1:4.5) with a focal-length ratio of about 2:1.

A more particular object is to provide a lens assembly for the purpose set forth whose minimum overall focal length, defining the wide-angle end of the varifocal range, is less than the image diagonal so as to provide a large field angle.

SUMMARY OF THE INVENTION

Let $f_I$, $f_{II}$, $f_{III}$, $f_{IV}$ and $f_V$ be the individual focal lengths of the four components I, II, III, IV of the adjustable front group and of the fixed rear group V, respectively. The absolute values of these individual focal lengths in my improved objective all are of the order of magnitude of the diagonal FD of the image projected upon a receiving surface, such as a film, positioned in a transverse plane separated by an invariable back-focal distance from the lat vertex of the rear lens group. The first component consists of a negative front lens L1 followed by three positive lenses L2, L3 and L4, while the second component consists of two negative lenses L5, L6 followed by a positive lens L7; the third and fourth components respectively consist of a negative lens L8 and a positive lens L9. I have found that, in order to realize the aforestated objects, the following requirements should be satisfied by the individual focal lengths $f_I$–$f_{IV}$, the radius r2 of the rear surface of lens L1, the radius r3 of the front surface of lens L2, the air spaces d10 and d12 respectively separating lens L6 from lenses L5 and L7, the radii r10 and r12 of the rear surfaces of lenses L5 and L6, and the radius r13 of the front surface of lens L7:

(1) $|f_I| \geq FD$,
(2) $|f_{II}| \leq FD$,
(3) $|f_{III}| \geq FD$,
(4) $f_{IV} \leq 0.5(|f_{II}| + |f_{III}|)$,
(5) r3 < r2,
(6) d10 > 2d12,
(7) r13 < 0.6(r10 + r12).

Moreover, the stroke of the second component (i.e. the difference of its distances from the first component in the two limiting positions defining the wide-angle and the telephoto ends of the varifocal range) should be less than 0.6FD while the distances of the two movable components from each other in their two limiting positions should differ from each other by less than $0.5f_{II}$.

Relationships (1) through (4) establish the desired varifocal range. Relationship (5) minimizes the spherical zonal aberration in multilens component I. Relationships (6) and (7) help correct coma and astigmatism whereas the last two conditions lead to favorable dimensions for the total axial length and the lens diameters of the objective.

In the objective more particularly described hereinafter, not only the minimum and maximum overall focal length $F_{min}$ and $F_{max}$ but also the image diagonal FD and the individual focal lengths $f_I$, $f_{IV}$ and $f_V$ as well as the back-focal distance s' lie between $|f_{II}|$ and $|f_{III}|$. Radius r13, moreover, lies roughly midway between radii r10 and r12.

With each of the lenses L1,L9 of the adjustable front group designed as a singlet, the objects of my invention are also satisfied if the front and rear surfaces of these lenses, identified by the radii a1–a18, have surface powers (n−1)/r—with r based on a value of unity for individual focal length $f_V$—within the following ranges:

(r1) +0.050 to +0.075
(r2) −0.820 to −0.940
(r3) +0.780 to +0.860
(r4) +0.060 to +0.080
(r5) +0.540 to +0.600
(r6) −0.160 to −0.200
(r7) +1.000 to +1.150
(r8) −0.560 to −0.650
(r9) +0.180 to +0.210
(r10) −2.800 to −3.100
(r11) −0.400 to −0.470
(r12) −1.050 to −1.250
(r13) +1.750 to +2.050
(r14) +0.040 to +0.050
(r15) −0.680 to −0.800
(r16) +0.020 to +0.030
(r17) +0.900 to +1.050
(r18) +0.270 to +0.330

Referred to the same value of $f_V = 1$, the axial thickness of the lenses, their fixed separations and the main values of their variable separations are all equal to 0.1 or less.

BRIEF DESCRIPTION OF THE DRAWING

The above and other features of my invention will now be described in detail with reference to the accompanying drawing in which.

SPECIFIC DESCRIPTION

Figure 1:
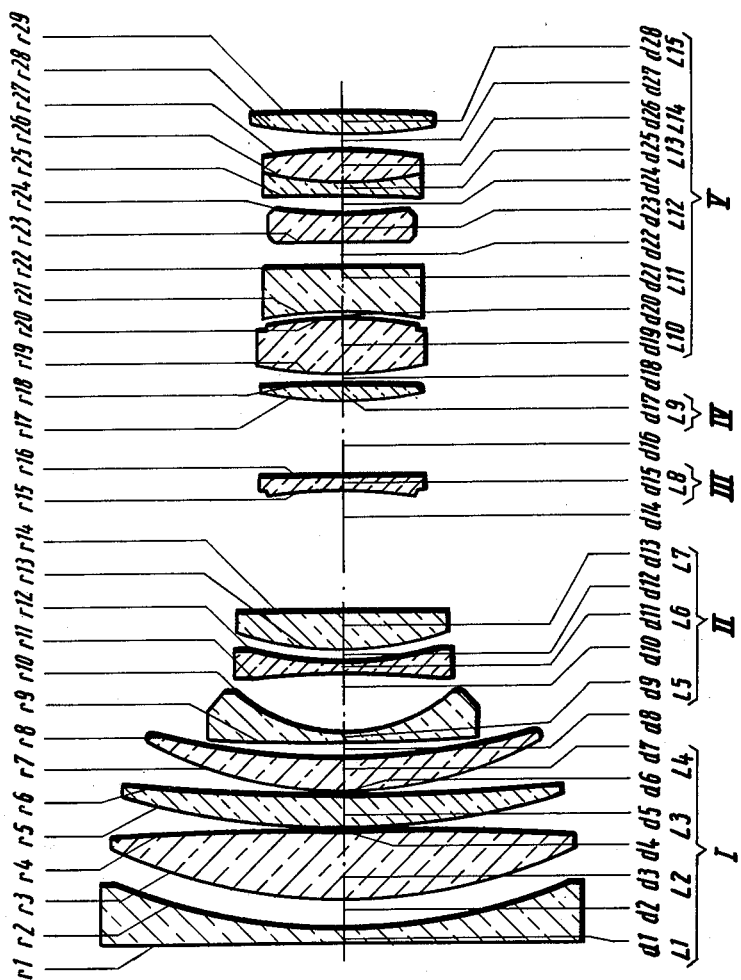
FIG. 1 diagrammatically illustrates a varifocal objective embodying my invention.

In FIG. 1 I have shown a varifocal objective according to my invention with a front lens group consisting of a substantially stationary first component I of positive refractivity, an axially shiftable second component II of negative refractivity, a similarly shiftable third component III also of negative refractivity, and a positively refracting stationary fourth component IV; these components are followed by a fixed rear lens group V.

Component I consists of a negative front lens L1, with radii r1,r2 and thickness d1, separated by an air space d2 from three positive lenses L2 (radii r3, r4 and thickness d3), L3 (radii r5,r6 and thickness d5) and L4 (radii r7,r8 and thickness d7), the intervening air spaces being designated d4 and d6. Component II consists of a negative lens L5 (radii r9, r10 and thickness d9) separated by an air space d10 from a negative lens L6 (radii r11, r12 and thickness d11) which in turn is separated by an air space d12 from a positive lens L7 (radii r13, r14 and thickness d13). Component III is a single negative lens L8 with radii r15,r16 and thickness d15; component IV is a single positive lens L9 with radii r17,r18 and thickness d17. Rear group V consists of a positive lens L10 (radii r19, r20 and thickness d19) separated by an air space d18 from lens L9, a negative lens L11 (radii r21,r22 and thickness d21), another negative lens L12 (radii r23,r24 and thickness d23), a doublet formed from a negative lens L13 (radii r25,r26 and thickness d25) cemented onto a positive lens L14 (radii r26,r27 and thickness d26), and a final positive lens L15 (radii r28,r29 and thickness d28); the intervening air spaces have been designated d20, d22, d24 and d27.

Three variable air spaces d8, d14 and d16 exist between lenses L5/L6, L7/L8 and L8/L9. In the illustrated position, air space d8 has its minimum value while air space d14 and d16 are at a maximum; this corresponds to the wide-angle end of the varifocal range. The variations of spaces d8 and d14 throughout that range have been shown in FIGS. 3 and 4 for different sets of parameters tabulated hereinafter.

Figure 2:
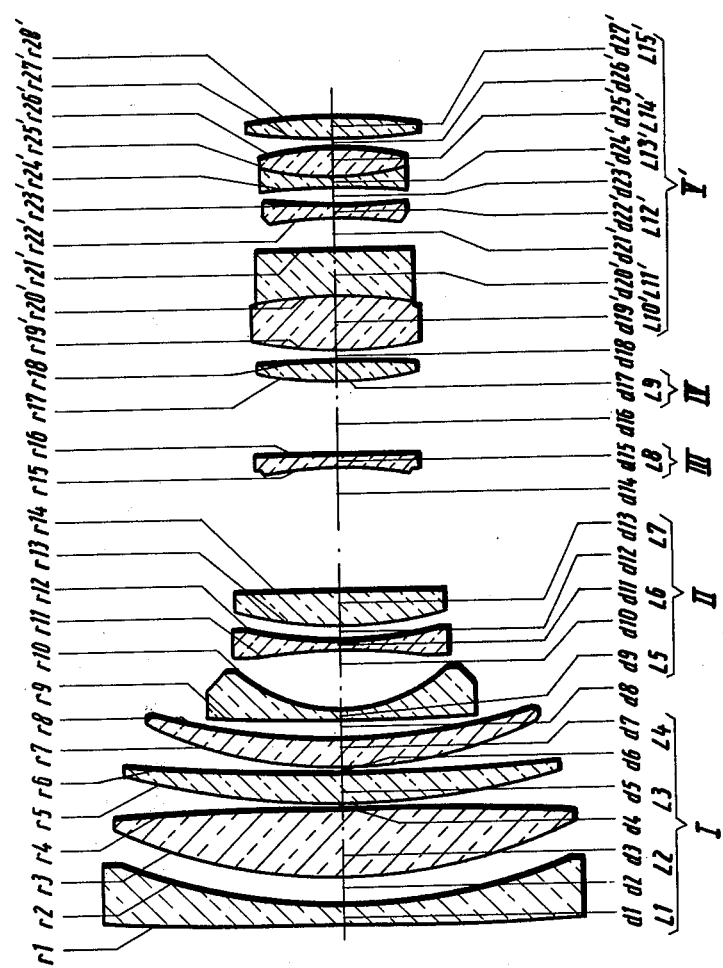
FIG. 2 is a view similar to FIG. 1, showing a modified rear lens group.

The objective shown in FIG. 2 differs from that of FIG. 1 only by the substitution of a modified rear lens group V' for group V. Group V' consists of a doublet formed from a positive lens L10 (radii r19', r20' and thickness d19') cemented onto a negative lens L11' (radii r20', r21' and thickness d20'), a negative lens L12' (radii r22', r23' and thickness d22'), another doublet formed from a negative lens L13' (radii r24', r25' and thickness d24') cemented onto a positive lens L14' (radii r25', r26' and thickness d25'), and a final positive lens L15' (radii r27', r28' and thickness d27'); the intervening air spaces have been designated d21', d23' and d26'.

Representative values for the radii r1–r18 and the thicknesses and separations d1–d17 of lenses L1–L9, based on a value of unity for the individual focal length $f_V$ of lens group $V$ or V', have been given in the following Tables I, II and III together with the refractive indices $n_e$ and the Abbé numbers $v_e$ of these lenses as well as their surface powers $\Delta n/r$ (with $\Delta n = n_e - 1$) and with r representing the respective radii r1–r18.

TABLE I

| COMPONENTS | LENSES | RADII | THICKNESSES AND SEPARATIONS | $n_e$ | $v_e$ | $\Delta n/r$ |
|---|---|---|---|---|---|---|
| I | L1 | r1 = +14.05 | d1 = 0.02 | 1.79 | 25.9 | +0.056 |
|   |    | r2 = +0.87 | d2 = 0.04 |      |      | −0.910 |
|   | L2 | r3 = +0.81 | d3 = 0.09 | 1.69 | 54.5 | +0.857 |
|   |    | r4 = −9.44 | d4 = 0.001 |      |      | +0.074 |
|   | L3 | r5 = +1.17 | d5 = 0.05 | 1.69 | 54.5 | +0.593 |
|   |    | r6 = +3.85 | d6 = 0.001 |      |      | −0.180 |
|   | L4 | r7 = +0.61 | d7 = 0.05 | 1.69 | 54.5 | +1.138 |
|   |    | r8 = +1.11 | d8 = 0.022–0.279 |  |  | −0.625 |
| II | L5 | r9 = +3.61 | d9 = 0.02 | 1.72 | 47.7 | +0.200 |
|   |    | r10 = +0.24 | d10 = 0.08 |    |      | −3.002 |
|   | L6 | r11 = −1.58 | d11 = 0.02 | 1.72 | 47.7 | −0.456 |
|   |    | r12 = +0.60 | d12 = 0.02 |    |      | −1.200 |
|   | L7 | r13 = +0.40 | d13 = 0.05 | 1.79 | 25.9 | +1.980 |
|   |    | r14 = −16.88 | d14 = 0.172–0.017 |  |  | +0.047 |
| III | L8 | r15 = −0.64 | d15 = 0.02 | 1.48 | 70.2 | −0.764 |
|   |    | r16 = −18.85 | d16 = 0.110–0.007 |  |  | +0.026 |
| IV | L9 | r17 = +0.75 | d17 = 0.02 | 1.74 | 44.5 | +0.997 |
|   |    | r18 = −2.40 |           |      |      | +0.312 |

The individual focal lengths are:
$f_I = +0.93$
$f_{II} = -0.45$
$f_{III} = -1.35$
$f_{IV} = +0.77$

TABLE II

| COMPONENTS | LENSES | RADII | THICKNESSES AND SEPARATIONS | $n_e$ | $v_e$ | $\Delta n/r$ |
|---|---|---|---|---|---|---|
| I | L1 | r1 = +10.87 | d1 = 0.02 | 1.79 | 25.9 | +0.073 |
|   |    | r2 = +0.86 | d2 = 0.04 |      |      | −0.921 |
|   | L2 | r3 = +0.81 | d3 = 0.09 | 1.69 | 54.5 | +0.857 |
|   |    | r4 = −9.44 | d4 = 0.001 |     |      | +0.074 |
|   | L3 | r5 = +1.18 | d5 = 0.05 | 1.69 | 54.5 | +0.588 |
|   |    | r6 = +3.55 | d6 = 0.001 |     |      | −0.195 |
|   | L4 | r7 = +0.62 | d7 = 0.05 | 1.69 | 54.5 | +1.119 |
|   |    | r8 = +1.15 | d8 = 0.022–0.280 |  |  | −0.603 |
|   | L5 | r9 = +3.61 | d9 = 0.02 | 1.72 | 47.7 | +0.200 |
|   |    | r10 = +0.24 | d10 = 0.08 |   |      | −3.002 |

TABLE II-continued

| COMPONENTS | LENSES | RADII | THICKNESSES AND SEPARATIONS | $n_e$ | $\nu_e$ | $\Delta n/r$ |
|---|---|---|---|---|---|---|
| II | L6 | r11 = −1.58 | d11 = 0.02 | 1.72 | 47.7 | −0.456 |
|  |  | r12 = +0.60 | d12 = 0.02 |  |  | −1.200 |
|  | L7 | r13 = +0.40 | d13 = 0.05 | 1.79 | 25.9 | +1.980 |
|  |  | r14 = −16.88 | d14 = 0.172−0.018 |  |  | +0.047 |
| III | L8 | r15 = −0.64 | d15 = 0.02 | 1.48 | 70.2 | −0.764 |
|  |  | r16 = −18.85 | d16 = 0.109−0.007 |  |  | +0.026 |
| IV | L9 | r17 = +0.75 | d17 = 0.02 | 1.74 | 44.5 | +0.997 |
|  |  | r18 = −2.40 |  |  |  | +0.312 |

The individual focal lengths are the same as in the case of Table I.

$f_{III} = -1.46$
$f_{IV} = +0.83$

TABLE III

| COMPONENTS | LENSES | RADII | THICKNESSES AND SEPARATIONS | $n_e$ | $\nu_e$ | $\Delta n/r$ |
|---|---|---|---|---|---|---|
| I | L1 | r1 = +15.16 | d1 = 0.03 | 1.79 | 25.9 | +0.052 |
|  |  | r2 = +0.94 | d2 = 0.05 |  |  | −0.842 |
|  | L2 | r3 = +0.88 | d3 = 0.10 | 1.69 | 54.5 | +0.789 |
|  |  | r4 = −10.18 | d4 = 0.001 |  |  | +0.068 |
|  | L3 | r5 = +1.27 | d5 = 0.05 | 1.69 | 54.5 | +0.546 |
|  |  | r6 = +4.15 | d6 = 0.001 |  |  | −0.167 |
|  | L4 | r7 = +0.66 | d7 = 0.05 | 1.69 | 54.5 | +1.052 |
|  |  | r8 = +1.19 | d8 = 0.022−0.300 |  |  | −0.583 |
| II | L5 | r9 = +3.90 | d9 = 0.02 | 1.72 | 47.7 | +0.185 |
|  |  | r10 = +0.25 | d10 = 0.09 |  |  | −2.882 |
|  | L6 | r11 = −1.71 | d11 = 0.02 | 1.72 | 47.7 | −0.421 |
|  |  | r12 = +0.65 | d12 = 0.02 |  |  | −1.108 |
|  | L7 | r13 = +0.44 | d13 = 0.05 | 1.79 | 25.9 | +1.800 |
|  |  | r14 = −18.21 | d14 = 0.187−0.019 |  |  | +0.043 |
| III | L8 | r15 = −0.69 | d15 = 0.02 | 1.48 | 70.2 | −0.709 |
|  |  | r16 = −20.33 | d16 = 0.118−0.008 |  |  | +0.024 |
| IV | L9 | r17 = +0.81 | d17 = 0.02 | 1.74 | 44.5 | +0.923 |
|  |  | r18 = −2.59 |  |  |  | +0.289 |

The individual focal lengths are:
$f_I = +1.0$
$f_{II} = -0.48$

Representative values for the lenses of group V (FIG. 1) are as follows:

TABLE IV

| COMPONENT | LENSES | RADII | THICKNESSES AND SEPARATIONS | $n_e$ | $\nu_e$ | $\Delta n/r$ |
|---|---|---|---|---|---|---|
| V | L10 | r19 = +0.73 | d18 = 0.01 | 1.72 | 50.2 | +0.9861 |
|  |  | r20 = −0.70 | d19 = 0.07 |  |  | +1.0266 |
|  | L11 | r21 = −0.51 | d20 = 0.005 | 1.59 | 38.9 | −1.1783 |
|  |  | r22 = −7.67 | d21 = 0.06 |  |  | +0.0780 |
|  | L12 | r23 = +2.65 | d22 = 0.03 | 1.52 | 59.2 | +0.1990 |
|  |  | r24 = +0.47 | d23 = 0.04 |  |  | −1.1055 |
|  | L13 | r25 = −2.65 | d24 = 0.02 | 1.81 | 25.2 | −0.3057 |
|  |  | r26 = +0.39 | d25 = 0.01 |  |  | −0.7474 |
|  | L14 | r27 = −0.46 | d26 = 0.05 | 1.52 | 59.2 |  |
|  |  |  | d27 = 0.01 |  |  | +1.1381 |
|  | L15 | r28 = +0.65 | d28 = 0.03 | 1.50 | 56.2 | +0.7726 |
|  |  | r29 = −6.33 |  |  |  | +0.0794 |

Representative values for the lenses of group V' (FIG. 2) are as follows:

TABLE V

| COMPONENT | LENSES | RADII | THICKNESSES AND SEPARATIONS | $n_e$ | $\nu_e$ | $\Delta n/r$ |
|---|---|---|---|---|---|---|
| V' | L10' | r19' = +0.68 | d19' = 0.07 | 1.72 | 50.2 | +1.0486 |
|  | L11' | r20' = −1.89 | d20' = 0.07 | 1.59 | 38.9 | +0.0655 |
|  |  | r21' = +12.57 | d21' = 0.04 |  |  | −0.0481 |
|  | L12' | r22' = −0.51 | d22' = 0.01 | 1.52 | 59.2 | −1.0254 |
|  |  | r23' = +1.24 | d23' = 0.02 |  |  | −0.4217 |
|  | L13' | r24' = −1.69 | d24' = 0.01 | 1.81 | 25.2 | −0.4797 |
|  | L14' | r25' = +0.38 | d25' = 0.04 | 1.52 | 59.2 | −0.7481 |

TABLE V-continued

| COMPONENT | LENSES | RADII | THICKNESSES AND SEPARATIONS | $n_e$ | $v_e$ | $\Delta n/r$ |
|---|---|---|---|---|---|---|
| | | r26' = −0.38 | d26' = 0.01 | | | +1.3624 |
| | L15' | r27' = +0.93 | d27' = 0.02 | 1.50 | 56.2 | +0.5386 |
| | | r28' = −0.86 | | | | +0.5804 |

The lens assemblies for Tables I, II and III may be combined with either of the lens assemblies given in Tables IV and V to yield a varifocal objective having a relative aperture of 1:45 and a varifocal ratio of about 2:1.

More particularly, the objective represented by a combination of Tables I and IV has overall focal lengths $F_{min} = 0.617$ and $F_{max} = 1.233$; the same is true of the combinations of Table II with Table IV and Table III with Table V. The back-focal length s' varies slightly in these three instances, being 0.84 in the first, 0.88 in the second and 0.85 in the third case.

Figure 3:
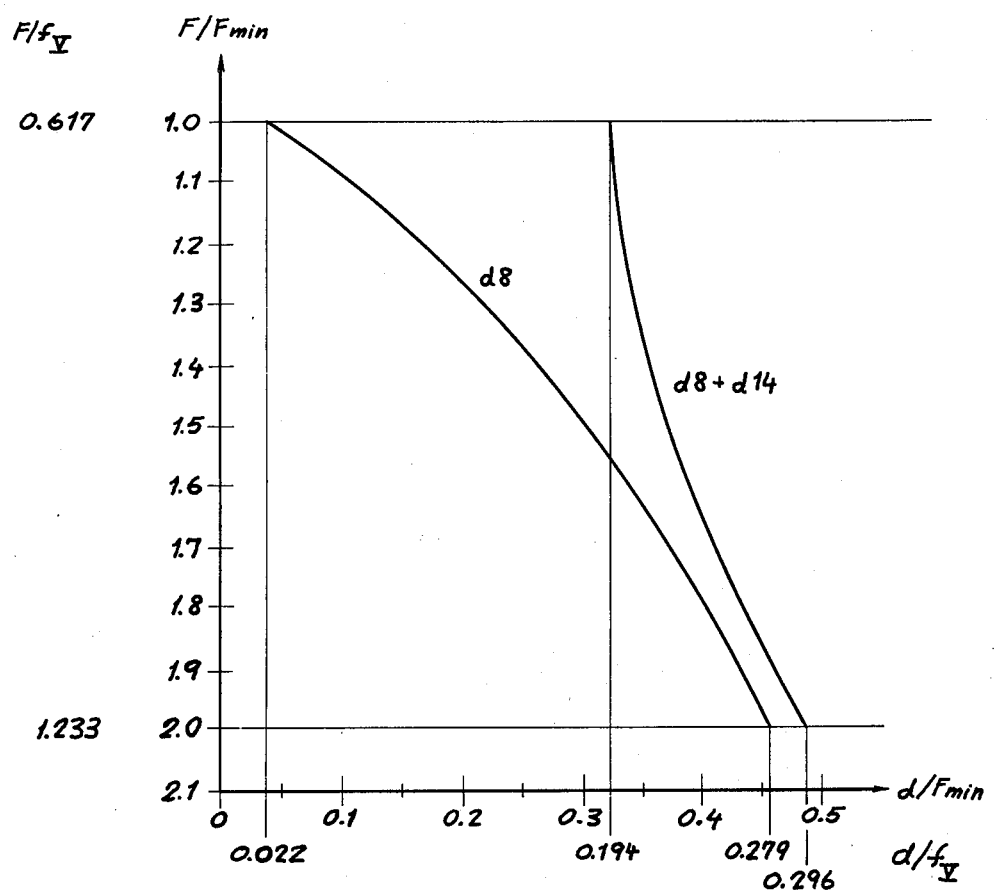
FIG. 3 is a graph representing the displacement of the shiftable components of the front lens group having parameters substantially as given hereinafter in Tables I and II.
Figure 4:
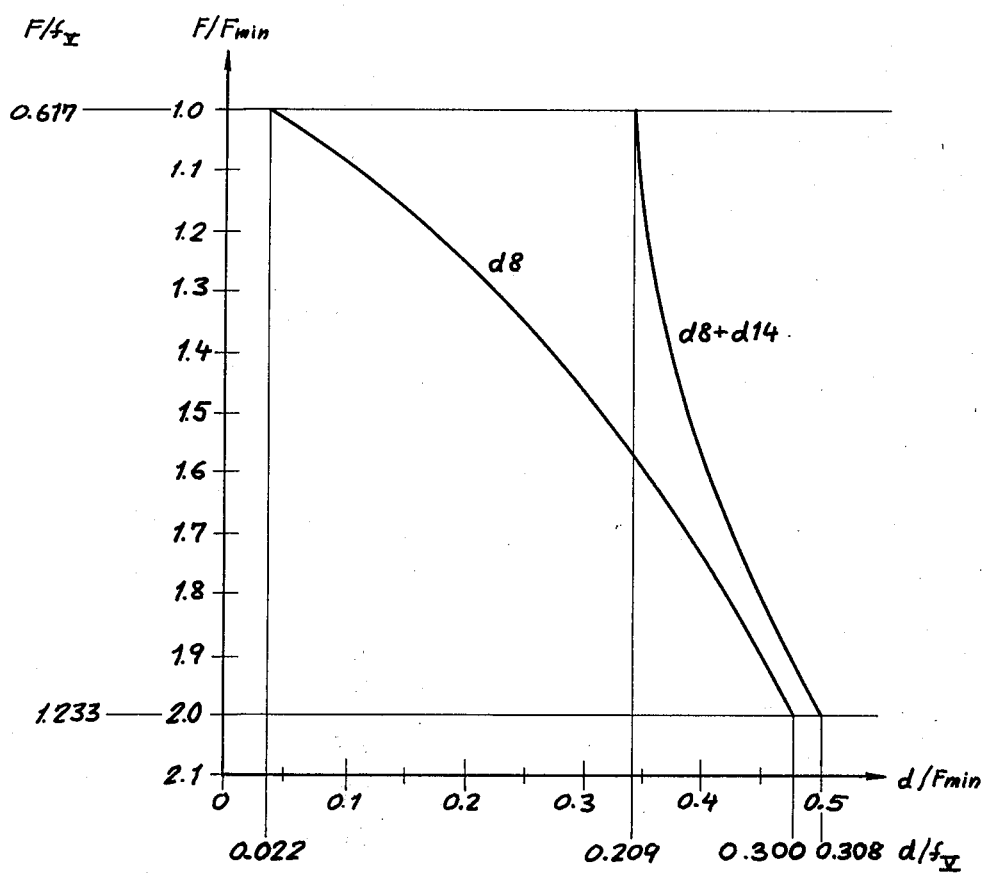
FIG. 4 is a set of graphs similar to FIG. 3 but relating to a front lens group having parameters substantially as given hereinafter in Table III.

In FIGS. 3 and 4, where the left-hand curve represents the variable air space d8 and the right-hand curve represents the sum of air spaces d8 and d14 so as to show the actual positions of components II and III relative to component I, I have given the values of the overall focal length F (along the ordinate axis) in terms of the ratio $F/F_{min}$ and also, for the limiting values $F_{min}$ and $F_{max}$, in terms of the ratio $F/f_V$ corresponding to the reference value used in the preceding Tables.

Similarly, the variable distances have been given (along the abscissa axis) in terms of $d/F_{min}$ and also, for the limiting positions, in terms of $d/f_V$. It will be noted that the values given for distances d8 and d8+d14 in FIG. 3 correspond to those of Table I and closely approximate those of Table II; the values of FIG. 4 agree with those of Table III.

It will be apparent that some of the singlets L1–L9 of the varifocal group I–IV could be replaced by equivalent doublets with cemented surfaces, for better correction of chromatic aberrations, as is well known per se.

I claim:

1. In an optical objective with an adjustable front group and a fixed rear group, said front group consisting of a substantially stationary positive first component, an axially shiftable negative second component, an axially shiftable negative third component and a fixed positive fourth component, said second and third components having first limiting positions relatively close to said first component and remote from each other for establishing a minimum overall focal length $F_{min}$ and having second limiting positions relatively remote from said first component and close to each other for establishing a maximum overall focal length $F_{max}$, the axial shifting of said second and third components between said first and second limiting positions thereof being correlated to project an image of an object upon a receiving surface in a plane separated from said rear group by an invariable back-focal distance,
   the improvement wherein said first, second, third and fourth components and said rear group having respective individual focal lengths $f_I$, $f_{II}$, $f_{III}$, $f_{IV}$, $f_V$ whose absolute values are of the order of magnitude of the diagonal FD of the projected image, said first component consisting of a negative front lens L1 followed by three positive lenses L2, L3, L4, said second component consisting of two negative lenses L5, L6 followed by a positive lens L7, said third component consisting of a negative lens L8, said fourth component consisting of a positive lens L9, said front lens L1 having a rear surface of radius r2, said lens L2 having a front surface of radius r3, said lens L6 being separated from lenses L5 and L7 by respective air spaces d10 and d12, said lenses L5 and L6 having rear surfaces of respective radii r10 and r12, said lens L7 having a front surface of radius r13, the following conditions being satisfied:
   $f_I \geq FD$,
   $|f_{II}| \leq FD$,
   $|f_{III}| \geq FD$,
   $f_{IV} \leq 0.5(|f_{II}| + |f_{III}|)$,
   $r3 < r2$,
   $d10 > 2d12$,
   $r13 < 0.6(r10 + r12)$,
   the distances of said second component from said first component in said first and second limiting positions differing from each other by less than 0.6FD, the distances of said third component from said second component in said first and second limiting positions differing from each other by less than $0.5f_{II}$.

2. The improvement defined in claim 1 wherein the ratio of said overall focal lengths $F_{max}:F_{min}$ is substantially 2:1.

3. The improvement defined in claim 2 wherein said overall focal length $F_{min}$ and $F_{max}$, said diagonal FD, said individual focal lengths $f_I$, $f_{IV}$, and $f_V$ and said back-focal distance all lie between $|f_{II}|$ and $|f_{III}|$.

4. The improvement defined in claim 3 wherein $r10 < r13 < r12$.

5. The improvement defined in claim 4 wherein the surface radii r1 to r18 and the refractive indices n or the lenses L1 to L9 of said front group are so chosen, with reference to a value of unity for the individual focal length $f_V$ of said rear group, as to have surface powers $(n−1)/r$ within the following ranges for the surfaces thereof defined by their respective radii:

(r1) +0.050 to +0.075
(r2) −0.820 to −0.940
(r3) +0.780 to +0.860
(r4) +0.060 to +0.080
(r5) +0.540 to +0.600
(r6) −0.160 to −0.200
(r7) +1.000 to +1.150
(r8) −0.560 to −0.650
(r9) +0.180 to +0.210
(r10) −2.800 to −3.100
(r11) −0.400 to −0.470
(r12) −1.050 to −1.250
(r13) +1.750 to +2.050
(r14) +0.040 to +0.050
(r15) −0.680 to −0.800
(r16) +0.020 to +0.030
(r17) +0.900 to +1.050
(r18) +0.270 to +0.330

6. The improvement defined in claim 5 wherein the thicknesses of said lenses L1 to L9, the fixed separations thereof and the mean values of their variable separations do not exceed substantially $0.1f_V$.

7. The improvement defined in claim 6 wherein the radii r1 to r18 and the thicknesses and separations d1 to d17 of said lenses L1 to L9, based upon said value of unity for $f_V$, their refractive indices n and their Abbé numbers $v$ have numerical values substantially as given in the following table:

| LENSES | RADII | THICKNESSES AND SEPARATIONS | n | $v$ |
|---|---|---|---|---|
| L1 | r1 = +14.1 | d1 = 0.02 | 1.79 | 26 |
|    | r2 = +0.9  | d2 = 0.04 |      |    |
| L2 | r3 = +0.8  | d3 = 0.09 | 1.69 | 55 |
|    | r4 = −9.4  | d4 = 0.001|      |    |
| L3 | r5 = +1.2  | d5 = 0.05 | 1.69 | 55 |
|    | r6 = +3.9  | d6 = 0.001|      |    |
| L4 | r7 = +0.6  | d7 = 0.05 | 1.69 | 55 |
|    | r8 = +1.1  | d8 = 0.02–0.28 |   |    |
| L5 | r9 = +3.6  | d9 = 0.02 | 1.72 | 48 |
|    | r10 = +0.2 | d10 = 0.08|      |    |
| L6 | r11 = −1.6 | d11 = 0.02| 1.72 | 48 |
|    | r12 = +0.6 | d12 = 0.02|      |    |
| L7 | r13 = +0.4 | d13 = 0.05| 1.79 | 26 |
|    | r14 = −16.9| d14 = 0.17–0.02 |   |    |
| L8 | r15 = −0.6 | d15 = 0.02| 1.48 | 70 |
|    | r16 = −18.9| d16 = 0.11–0.01 |   |    |
| L9 | r17 = +0.8 |           |      |    |
|    | r18 = −2.4 | d17 = 0.02| 1.74 | 45 |

8. The improvement defined in claim 6 wherein the radii r1 to r18 and the thicknesses and separations d1 to d17 of said lenses L1 to L9, based upon said value of unity for $f_V$, their refractive indices n and their Abbé numbers $v$ have numerical values substantially as given in the following table:

| LENSES | RADII | THICKNESSES AND SEPARATIONS | n | $v$ |
|---|---|---|---|---|
| L1 | r1 = +10.9 | d1 = 0.02 | 1.79 | 26 |
|    | r2 = +0.9  | d2 = 0.04 |      |    |
| L2 | r3 = +0.8  | d3 = 0.09 | 1.69 | 55 |
|    | r4 = −9.4  | d4 = 0.001|      |    |
| L3 | r5 = +1.2  | d5 = 0.05 | 1.69 | 55 |
|    | r6 = +3.6  | d6 = 0.001|      |    |
| L4 | r7 = +0.6  | d7 = 0.05 | 1.69 | 55 |
|    | r8 = +1.2  | d8 = 0.02–0.28 |   |    |
| L5 | r9 = +3.6  | d9 = 0.02 | 1.72 | 48 |
|    | r10 = +0.2 | d10 = 0.08|      |    |
| L6 | r11 = −1.6 | d11 = 0.02| 1.72 | 48 |
|    | r12 = +0.6 | d12 = 0.02|      |    |
| L7 | r13 = +0.4 | d13 = 0.05| 1.79 | 26 |
|    | r14 = −16.9| d14 = 0.17–0.02 |   |    |
| L8 | r15 = −0.6 | d15 = 0.02| 1.48 | 70 |
|    | r16 = −18.9| d16 = 0.11–0.01 |   |    |
| L9 | r17 = +0.8 |           |      |    |
|    | r18 = −2.4 | d17 = 0.02| 1.74 | 45 |

9. The improvement defined in claim 6 wherein the radii r1 to r18 and the thicknesses and separations d1 to d17 of said lenses L1 to L9, based upon said value of unity for $f_V$, their refractive indices n and their Abbé numbers $v$ have numerical values substantially as given in the following table:

| LENSES | RADII | THICKNESSES AND SEPARATIONS | n | $v$ |
|---|---|---|---|---|
| L1 | r1 = +15.2 | d1 = 0.03 | 1.79 | 26 |
|    | r2 = +0.9  | d2 = 0.05 |      |    |
| L2 | r3 = +0.9  | d3 = 0.10 | 1.69 | 55 |
|    | r4 = −10.2 | d4 = 0.001|      |    |
| L3 | r5 = +1.3  | d5 = 0.05 | 1.69 | 55 |
|    | r6 = +4.2  | d6 = 0.001|      |    |
| L4 | r7 = +0.7  | d7 = 0.05 | 1.69 | 55 |
|    | r8 = +1.2  | d8 = 0.02–0.30 |   |    |
| L5 | r9 = +3.9  | d9 = 0.02 | 1.72 | 48 |
|    | r10 = +0.3 | d10 = 0.09|      |    |
| L6 | r11 = −1.7 | d11 = 0.02| 1.72 | 48 |
|    | r12 = +0.7 | d12 = 0.02|      |    |
| L7 | r13 = +0.4 | d13 = 0.05| 1.79 | 26 |
|    | r14 = −18.2| d14 = 0.19–0.02 |   |    |
| L8 | r15 = −0.7 | d15 = 0.02| 1.48 | 70 |
|    | r16 = −20.3| d16 = 0.12–0.01 |   |    |
| L9 | r17 = +0.8 |           |      |    |
|    | r18 = −2.6 | d17 = 0.02| 1.74 | 45 |

10. The improvement defined in claim 7, 8 or 9 wherein said rear group consists of a positive lens L10, two negative lenses L11 and L12, a negative lens L13 and a positive lens L14 cemented to each other, and a positive lens L15, the radii r19 to r29 and the thicknesses and separations d19 to d28 of said lenses L10 to L15, based upon said value of unity for $f_V$, their refractive indices n and their Abbé numbers $v$ having numerical values substantially as given in the following table:

| LENSES | RADII | THICKNESSES AND SEPARATIONS | n | $v$ |
|---|---|---|---|---|
| L10 | r19 = +0.7 | d18 = 0.01 | 1.72 | 50 |
|     | r20 = −0.7 | d19 = 0.07 |      |    |
| L11 | r21 = −0.5 | d20 = 0.01 | 1.59 | 39 |
|     | r22 = −7.7 | d21 = 0.06 |      |    |
| L12 | r23 = +2.7 | d22 = 0.03 | 1.52 | 59 |
|     | r24 = +0.5 | d23 = 0.04 |      |    |
| L13 | r25 = −2.7 | d24 = 0.02 | 1.81 | 25 |
|     | r26 = +0.4 | d25 = 0.01 |      |    |
| L14 |            | d26 = 0.05 | 1.52 | 59 |
|     | r27 = −0.5 | d27 = 0.01 |      |    |
| L15 | r28 = +0.7 |            |      |    |
|     | r29 = −6.3 | d28 = 0.03 | 1.50 | 56 |

11. The improvement defined in claim 7, 8 or 9 wherein said rear group consists of a positive lens L10' and a negative lens L11' cemented to each other, a negative lens L12', a negative lens L13' and a positive lens L14' cemented to each other, and a positive lens L15', the radii r19' to r28' and the thicknesses and separations d19' to d27' of said lenses L10' to L15', based upon said value of unity for $f_V$, their refractive indices n and their Abbé numbers $v$ having numerical values substantially as given in the following table:

| LENSES | RADII | THICKNESSES AND SEPARATIONS | n | $v$ |
|---|---|---|---|---|
| L10' | r19' = +0.7  | d19' = 0.07 | 1.72 | 50 |
| L11' | r20' = −1.9  | d20' = 0.07 | 1.59 | 39 |
|      | r21' = +12.6 | d21' = 0.04 |      |    |
| L12' | r22' = −0.5  | d22' = 0.01 | 1.52 | 59 |
|      | r23' = +1.2  | d23' = 0.02 |      |    |
| L13' | r24' = −1.7  | d24' = 0.01 | 1.81 | 25 |
| L14' | r25' = +0.4  | d25' = 0.04 | 1.52 | 59 |
|      | r26' = −0.4  | d26' = 0.01 |      |    |
| L15' | r27' = +0.9  |             |      |    |
|      | r28' = −0.9  | d27' = 0.02 | 1.50 | 56 |

* * * * *